US009626774B2

(12) United States Patent
Shah et al.

(10) Patent No.: US 9,626,774 B2
(45) Date of Patent: Apr. 18, 2017

(54) SATURATION VARYING COLOR SPACE

(71) Applicant: Pixar, Emeryville, CA (US)

(72) Inventors: Apurva Shah, San Mateo, CA (US); Sharon Calahan, Petaluma, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 14/484,989

(22) Filed: Sep. 12, 2014

(65) Prior Publication Data
US 2015/0071536 A1 Mar. 12, 2015

Related U.S. Application Data

(62) Division of application No. 13/741,501, filed on Jan. 15, 2013, now Pat. No. 8,842,913, which is a division of application No. 12/044,881, filed on Mar. 7, 2008, now Pat. No. 8,396,290.

(60) Provisional application No. 60/894,189, filed on Mar. 9, 2007.

(51) Int. Cl.
*G06T 11/00* (2006.01)
*G06T 5/00* (2006.01)

(52) U.S. Cl.
CPC .......... *G06T 11/001* (2013.01); *G06T 5/001* (2013.01); *G06T 5/009* (2013.01)

(58) Field of Classification Search
None
See application file for complete search history.

(56) References Cited

U.S. PATENT DOCUMENTS

| 5,623,527 | A | 4/1997 | Scott |
| 5,835,242 | A | 11/1998 | Itoh |
| 6,917,444 | B1 * | 7/2005 | Moriwaki ............ H04N 1/6005 358/1.9 |
| 7,127,122 | B2 | 10/2006 | Ogata et al. |
| 2003/0012433 | A1 | 1/2003 | Gruzdev et al. |
| 2003/0095122 | A1 | 5/2003 | Herken et al. |
| 2003/0156761 | A1 | 8/2003 | Ogata et al. |
| 2004/0257463 | A1 | 12/2004 | Goris et al. |
| 2005/0219259 | A1 * | 10/2005 | Gonsalves ............... H04N 1/62 345/593 |
| 2006/0164556 | A1 | 7/2006 | Samadani et al. |
| 2008/0134094 | A1 | 6/2008 | Samadani et al. |
| 2008/0143739 | A1 | 6/2008 | Harris et al. |
| 2008/0144963 | A1 * | 6/2008 | Lin ......................... H04N 9/77 382/274 |
| 2008/0303954 | A1 | 12/2008 | Haraguchi et al. |
| 2010/0278448 | A1 | 11/2010 | Friedhoff et al. |

\* cited by examiner

*Primary Examiner* — Bernard Krasnic
(74) *Attorney, Agent, or Firm* — Patterson + Sheridan, LLP

(57) ABSTRACT

A first color component of a pixel or scene entity is modified using a color correction curve defined at least partly by a second color component of this pixel or entity. Each pixel or entity has its own separate color correction curve, independent of the color correction curves of other pixels or entities. The saturation value of a pixel or scene entity may be modified based on its luminance value. The luminance value determines a saturation gamma function curve, mapping the original saturation value of a pixel or entity to a new saturation value. The unilluminated color of a pixel or of an illuminated entity in a scene being rendered may also be taken into account. This output color may be stored in the appropriate pixel of an image or combined with colors from other portions of the scene being rendered.

13 Claims, 4 Drawing Sheets

SATURATION VARYING COLOR SPACE

CROSS-REFERENCE TO RELATED APPLICATIONS

This application is a divisional application of co-pending U.S. patent application Ser. No. 13/741,501 (U.S. Pat. No. 8,842,913), filed Jan. 15, 2013, and entitled "Saturation Varying Color Space," which, in turn, is a divisional application of U.S. patent application Ser. No. 12/044,881 (U.S. Pat. No. 8,396,290), filed Mar. 7, 2008, and entitled "Saturation Varying Color Space," which, in turn, claims the benefit of U.S. Provisional Patent Application No. 60/894,189, filed Mar. 9, 2007 and entitled "Saturation Varying Color Space," all of which are incorporated by reference herein for all purposes.

BACKGROUND OF THE INVENTION

The present invention relates to the field of computer graphics, and in particular to methods and apparatus for assigning attribute values to surfaces of computer graphics models. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Color plays an important part in the aesthetics and emotional impact of images. Artists often design scenes with bright, vibrant colors. Later during the production, lighting designers add virtual lights to the scene to create highlights and shadows. Many computer graphics system use a simple additive illumination models. When surfaces are darkened due to shadowing using additive illumination models, the colors tend to become grey or muddy. This is because darkening colors is essentially the same as mixing black with the selected color.

In the real world, physical imagery does not suffer from these muddy colors in dark areas because of more complex, secondary light transport terms like irradiance and low level sub-surface scatter as well as aggressive use of exposure or tone curves to bring colors into the perceptually linear space.

To produce more vibrant or realistic colors in images, it is desirable to compensate for this desaturation effect. One prior approach uses tone mapping to adjust the "exposure" of the image. This changes the way that colors are mapped from light to dark. Although this corrects for desaturation in shadows and darkened areas, this tone mapping often adversely affects the contrast of the image.

Another prior approach uses colored shadows. Rather than darkening colors to black, colored shadows darken the shaded areas to a lighter color. The problem with colored shadows is that the color of the shadow is unrelated to the color of the shaded object. As a result, the shaded portions of the image look unnatural or stylized.

It is therefore desirable for a system and method to provide improved color saturation in shaded portions of an image without adversely affecting the overall image. It is also desirable for the system and method to provide users with precise control over the amount of saturation compensation applied to the image. It is also desirable for the system and method to allow for saturation compensation to be automatically applied during rendering or after rendering in post-production.

BRIEF SUMMARY OF THE INVENTION

An embodiment of the invention modifies a first color component of a pixel or scene entity using a color correction curve defined at least in part by the value of a second color component of this pixel or entity. In this embodiment, each pixel or entity has its own separate color correction curve, which is independent of the color correction curves of other pixels or entities.

In one embodiment, the saturation value of a pixel or scene entity is modified based on the pixel or entity's luminance value. The luminance value is used to determine a saturation gamma function curve. The saturation gamma function curve maps the original saturation value of a pixel or entity to a new saturation value. Because the saturation adjustment is dependent on the luminance value, dark and unsaturated colors can be modified substantially, while bright and unsaturated colors are left substantially unchanged. This embodiment may be used to increase the saturation or vibrancy of colors that are darkened due to shadows or other shading operations. This embodiment of the invention may be applied to any type of image represented in any color space in which the saturation value can be determined directly or indirectly.

Embodiments of the invention may be employed in a variety of contexts, including within or as a module to an image processing or compositing application and within or as a shader or module of a renderer. In the latter context, an embodiment of the invention may be applied to scene entities during rendering, fragments, or to pixels in an image.

A further embodiment may take into account the unilluminated color of a pixel or of an illuminated entity in a scene being rendered, in addition to or instead of the color of the pixel or entity after illumination. In this embodiment, the output color of an entity becomes a function of at least three independent parameters: at least one color component of the unilluminated color of the entity (i.e. the color of the entity not including any lighting or shadowing effects), and the luminance and saturation of the entity after illumination. For example, the illuminated color may be first normalized by the unilluminated color of that entity. After processing, the resulting modified color is converted back to its original color space, if necessary, and the normalization is reversed to produce an output color. This output color may be stored in the appropriate pixel of an image or combined with colors from other portions of the scene being rendered.

BRIEF DESCRIPTION OF THE DRAWINGS

The invention will be described with reference to the drawings, in which.

DETAILED DESCRIPTION OF THE INVENTION

Figure 1:
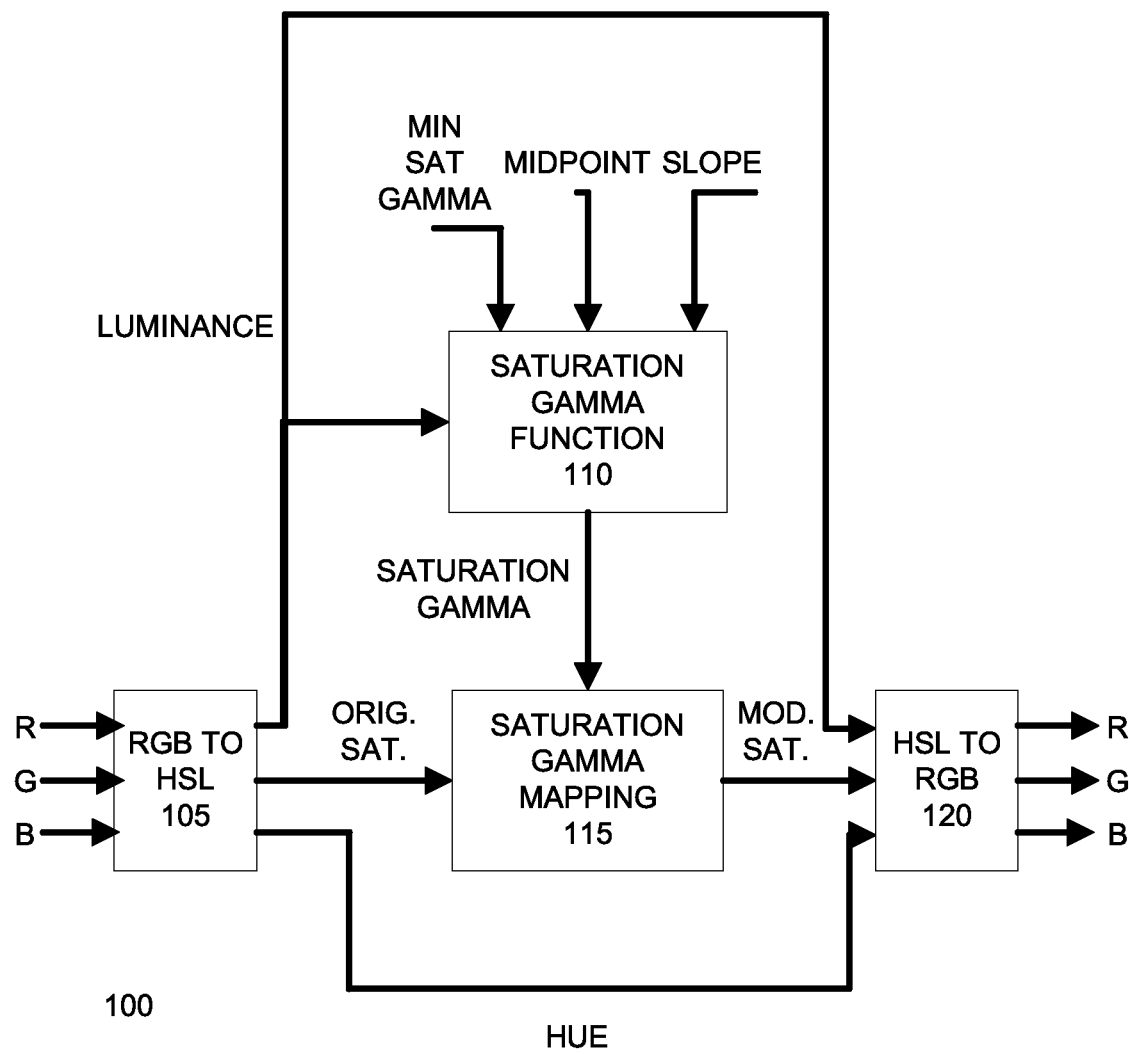
FIG. 1 illustrates a block diagram of a saturation compensation system according to an embodiment of the invention.

FIG. 1 illustrates a block diagram of a saturation compensation system 100 according to an embodiment of the invention. In an embodiment, the color values of a pixel in a source image are provided to an HSL conversion block 105. The HSL conversion block 105 converts the color values of a pixel from its native color space, such as an RGB color space, to a hue, saturation, luminance (HSL) color space. The hue is the inherent color of the pixel. The luminance is the lightness of the pixel, which ranges from black to white. The saturation of the pixel is "vibrancy" of the color. Lower saturation values make the color appear more gray or muddy.

In an embodiment of the invention, the saturation value of a pixel is modified based on the pixel's luminance value. Because the saturation adjustment is dependent on the luminance value, dark and unsaturated colors can be modified substantially, while bright and unsaturated colors are left substantially unchanged.

To this end, the luminance value of the pixel is provided to the saturation gamma function 110. The output of the saturation gamma function 110 is a saturation gamma mapping value used to modify the saturation value of the pixel. The saturation gamma function determines the saturation gamma mapping value using the luminance value and one or more input parameters. In an embodiment, these input parameters are the minimum saturation gamma, which specifies how aggressively to change the saturation of dark colors; the midpoint, which is the luminance value at which the saturation of a color is unchanged; and the saturation gamma exponent, which specifies the slope of the saturation gamma function as it approaches the midpoint.

Figure 2:
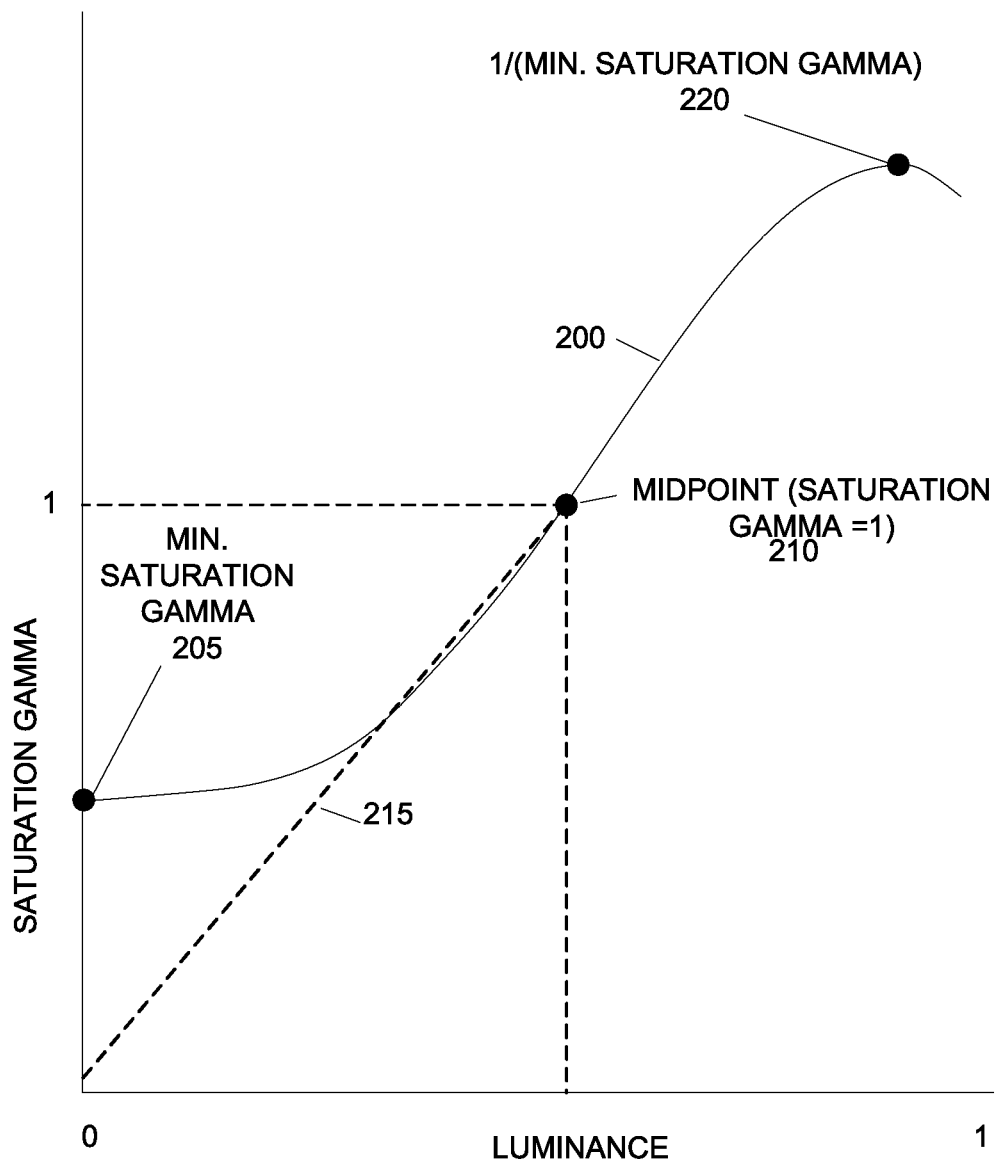
FIG. 2 illustrates an example luminance-saturation gamma curve according to an embodiment of the invention.

In an embodiment, the input parameters define a curve mapping an input luminance value to an output saturation gamma value. FIG. 2, discussed below, illustrates a luminance-saturation gamma curve in more detail.

The output of the saturation gamma function 110 is a saturation gamma mapping value used to modify the saturation value of the pixel. Saturation gamma mapping block 115 receives the saturation gamma value from block 110 and the original saturation value of the pixel $S_0$. In an embodiment, the saturation value of a pixel is modified by a gamma mapping function $S_O = S_i^{1/(SATURATION\ GAMMA)}$, where $S_i$ is the initial saturation value of a pixel and $S_O$ is the output saturation. Because the value of saturation ranges from 0 to 1, a saturation gamma value less than 1 will increase the saturation of a pixel, while a saturation gamma value greater than 1 will decrease the saturation of the pixel.

The output of the saturation gamma mapping block 115 is a modified saturation value. The modified saturation value is provided along with the original hue and luminance values of the pixel to the RGB conversion block 120. The RGB conversion block 120 converts the modified saturation value and the original hue and luminance values back to the RGB color space (or any other color space) required for the pixel.

Unlike other color modification schemes, this embodiment of the saturation gamma function varies for each pixel based on the pixel's luminance value. Thus, the final saturation value of a pixel is function of two independent inputs: the luminance value of the pixel and the initial input saturation of the pixel.

FIG. 2 illustrates a luminance-saturation gamma curve 200 in more detail. The luminance-saturation gamma curve 200 maps an input luminance value of a pixel to a saturation gamma value. Because each pixel may have a different luminance value, the saturation gamma value may also vary for each pixel. As discussed above, the curve 200 is specified by input parameters of the minimum saturation gamma 205, which specifies how aggressively to change the saturation of dark colors; the midpoint 210, which is the luminance value at which the saturation of a color is unchanged; and the saturation gamma exponent 215, which specifies the slope of the saturation gamma function as it approaches the midpoint.

As shown in FIG. 2, when the curve 200 crosses the midpoint 210, its slope is reversed to 1/(Saturation Gamma Exponent). The maximum saturation gamma value 220 that can be reached in this embodiment is 1/(minimum saturation gamma). Note that the function is undefined for $L_i$ over 1 so in order to support over range colors they have to be remapped to the 0-1 range.

In further embodiments, the luminance-saturation gamma curve 200 can be any arbitrary curve. For example, to only saturate dark colors or desaturate highlights, the value of saturation gamma can be fixed to 1 either above or below the midpoint, respectively. In some implementations, at least a portion of the curve 200 can be C2 continuous, which means curve 200 has a continuous slope and curvature, to ensure smooth color transitions.

Figure 3:
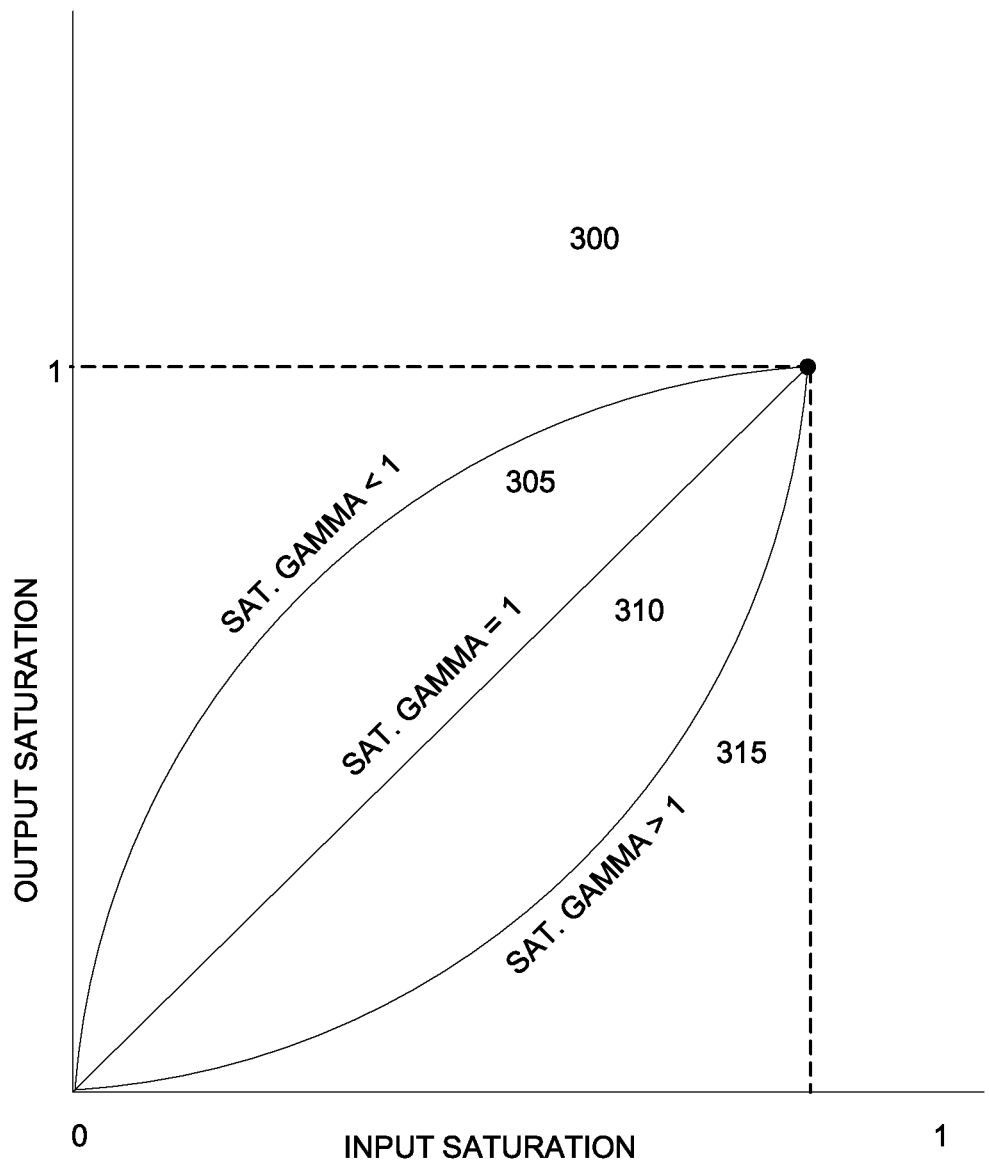
FIG. 3 illustrates example gamma function curves using saturation gamma values according to an embodiment of the invention.

FIG. 3 illustrates an example 300 of gamma function curves using saturation gamma values according to an embodiment of the invention. The gamma function curves map an input saturation value to an output saturation value. Curve 305 corresponds to a saturation gamma value less than 1, which increases the output saturation value relative to the input saturation. Curve 310 corresponds to a saturation gamma value equal to 1, which leaves the saturation unchanged. Curve 315 corresponds to a saturation gamma value less than 1, which decreases the output saturation value relative to the input saturation.

Curves 305, 310, and 315 are a subset of a family of gamma function curves generated by the expression $S_O = S_i^{SATURATION\ GAMMA}$. Each of these gamma function curves corresponds to a different luminance value. Thus, each pixel will have its saturation remapped according to the gamma function curve specified by its own luminance. One can view this family of gamma function curves as a surface defined by two independent input variables: luminance and input saturation, with the output saturation $S_O$ measured along a third axis.

Additionally, because the saturation gamma value used for a pixel is determined from the pixel's luminance value, an embodiment of the invention is essentially an image-keyed color grading system. Prior color grading systems map initial values of colors to output values of colors based on user-supplied modification parameters. However, this embodiment of the invention uses an image, in this case the set of the pixels' luminance values, to provide one parameter value for each pixel to modify the saturation of that pixel.

The saturation compensation system 100 can be employed in a variety of contexts. In one application, system 100 can be implemented within or as a module to an image processing or compositing application. During production or post-production, rendered images can be viewed using this application. System 100 can be used to modify the saturation of all or portions of rendered images to fine tune the look of an image or animation. In an embodiment, users can specify the parameters defining curve 200, or can specify curve 200 directly. System 100 can then modify the image and display it to users. This application allows users to experiment with different saturation mappings of rendered images.

In another application, system 100 can be implemented within or as a shader or module of a renderer. During rendering, the system 100 can modify the saturation of one or more rendered images automatically. For example, a user can specify the luminance-saturation curve (or the parameters defining this curve) in advance of rendering and provide instructions to the renderer to apply the saturation correction to all rendered images automatically.

In this example application, the system 100 may be applied either to pixels after rendering or alternatively to the scene entities, including points, particles, ray intersections, fragments, and geometry, such as surfaces or volumes, being rendered. For example, the renderer may determine the color of a point on a surface based on the surface color, the lighting color, shadowing data, and other surface and illumination parameters. Typically, the renderer then stores this color in the appropriate pixel to form a portion of an image. However, an embodiment of the invention may first modify the color of each point of the surface as described above and store the modified color in the appropriate pixel.

In an embodiment, system 100 can take into account the unilluminated color of a pixel or of an illuminated entity in a scene being rendered, in addition to or instead of the color of the entity after illumination. In this embodiment, the output color of an entity becomes a function of at least three independent parameters: at least one color component of the unilluminated color of the entity (i.e. the color of the entity not including any lighting or shadowing effects), and the luminance and saturation of the entity after illumination. For example, the illuminated color of a point or other portion of entity being rendered may be first normalized by the maximum component of the unilluminated color of that portion of the entity. The normalized color is then processed as described above to modify its saturation value based on its normalized, illuminated saturation and luminance. The resulting modified color is converted back to its original color space, if necessary, and the normalization is reversed to produce an output color for the point or portion of entity being rendered. This output color may be stored in the appropriate pixel of an image or combined with colors from other portions of the scene entity being rendered.

In another application, system 100 can be used to modify the saturation of non-computer generated images. Furthermore, other embodiments of system 100 can operate using other color spaces besides the HSL color space, such as the HSV, YIQ, XYZ, or any other color space from which a saturation value of a pixel can be determined directly or indirectly.

Figure 4:
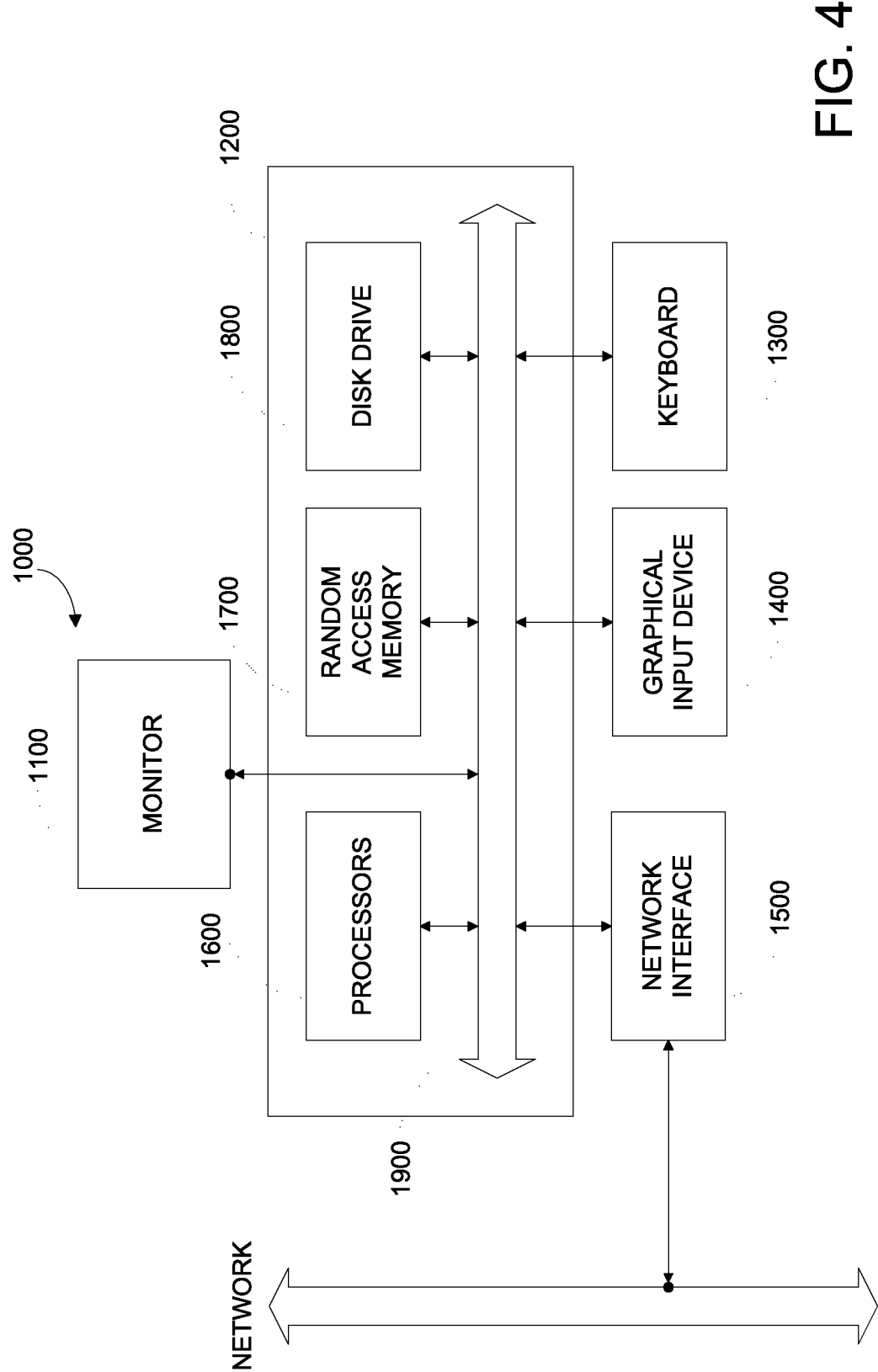
FIG. 4 illustrates a computer system suitable for implementing an embodiment of the invention.

FIG. 4 illustrates a computer system suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more processors 1600, and memory storage devices, such as a random access memory (RAM) 1700, disk drives 1800, and system bus 1900 interconnecting the above components. Processors 1600 can include one or more general purpose processors and optional special purpose processors for processing video data, audio data, or other types of data. RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices. Disk drive 1800 can include one or more hard disk drives connected to the computer 1200 via an internal connection, such as parallel or serial ATA, or via an external connection, such as iSCSI or other storage area network standards. Disk drive 1800 can use redundancy, such as a RAID subsystem, to improve performance, data integrity, and drive uptime.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of modifying saturation of an image, the method comprising:
   receiving color data for a pixel, wherein the color data includes a saturation value and a luminance value;
   determining a mapping between an input saturation value and an output saturation value based on at least the luminance value and not the saturation value of the received color data, wherein determining the mapping comprises using a predefined curve to obtain the mapping based on the luminance value and not the saturation value of the received color data, the predefined curve being specified via at least one user input parameter; and
   applying the determined mapping to the saturation value of the received color data for the pixel to create modified color data including a modified saturation value.

2. The method of claim 1, wherein receiving color data includes converting received color data from a first color space to a second color space including the saturation value.

3. The method of claim 2, wherein the second color space is a HSL (Hue, Saturation, Luminance) color space.

4. The method of claim 1, wherein the at least one user input parameter specifying the predefined curve includes a minimum value, a midpoint value at which saturation of a color is unchanged, and an exponent value specifying a slope of the predefined curve as it approaches the midpoint value.

5. The method of claim 1, further comprising outputting an image including the pixel with the modified color data from a renderer.

6. The method of claim 1, further comprising displaying an image including the pixel with the modified color data.

7. The method of claim 1, wherein the determined mapping includes an exponential function raised to a power determined based on at least the luminance value and not the saturation value of the received color data.

8. A system for modifying saturation of an image, the system comprising:
 a processor; and
 a memory containing instructions, that, when executed by the processor, cause the processor to:
  receive color data for a pixel, wherein the color data includes a saturation value and a luminance value,
  determine a mapping between an input saturation value and an output saturation value based on at least the luminance value and not the saturation value of the received color data, wherein determining the mapping comprises using a predefined curve to obtain the mapping based on the luminance value and not the saturation value of the received color data, the predefined curve being specified via at least one user input parameter, and
  apply the determined mapping to the saturation value of the received color data for the pixel to create modified color data including a modified saturation value.

9. The system of claim 8, wherein receiving color data includes converting received color data from a first color space to a second color space including the saturation value.

10. The system of claim 9, wherein the second color space is a HSL (Hue, Saturation, Luminance) color space.

11. The system of claim 8, wherein the instructions, when executed by the processor, further cause the processor to output an image including the pixel with the modified color data from a renderer.

12. The system of claim 8, wherein the instructions, when executed by the processor, further cause the processor to display an image including the pixel with the modified color data.

13. A non-transitory computer-readable storage medium including instructions that, when executed by a processor, cause the processor to perform an operation to modify saturation of an image, the operation comprising:
 receiving color data for a pixel, wherein the color data includes a saturation value and a luminance value;
 determining a mapping between an input saturation value and an output saturation value based on at least the luminance value and not the saturation value of the received color data, wherein determining the mapping comprises using a predefined curve to obtain the mapping based on the luminance value and not the saturation value of the received color data, the predefined curve being specified via at least one user input parameter; and
 applying the determined mapping to the saturation value of the received color data for the pixel to create modified color data including a modified saturation value.

\* \* \* \* \*